United States Patent
Ishimura (10) Patent No.: US 7,317,712 B2
(45) Date of Patent: Jan. 8, 2008

(54) WIRELESS COMMUNICATION SYSTEM, COMMUNICATION DEVICE, COMMUNICATION CONTROLLING METHOD, AND COMMUNICATION CONTROL PROGRAM

(75) Inventor: Takanari Ishimura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 528 days.

(21) Appl. No.: 11/047,606

(22) Filed: Feb. 2, 2005

(65) Prior Publication Data

US 2006/0039336 A1    Feb. 23, 2006

(30) Foreign Application Priority Data

Aug. 20, 2004  (JP)  ............................. 2004-241078

(51) Int. Cl.
*H04Q 7/24*  (2006.01)
(52) U.S. Cl. ....................... 370/338; 370/328; 713/153
(58) Field of Classification Search ...................... None
See application file for complete search history.

(56) References Cited

U.S. PATENT DOCUMENTS

| | | | |
|---|---|---|---|
| 2003/0063655 A1 | 4/2003 | Young | |
| 2004/0249983 A1* | 12/2004 | Bedner | ....................... 709/249 |
| 2005/0221858 A1* | 10/2005 | Hoddie | ........................ 455/557 |
| 2005/0243781 A1* | 11/2005 | Vesuna et al. | .............. 370/338 |
| 2006/0206592 A1* | 9/2006 | Fujii et al. | ................... 709/220 |

FOREIGN PATENT DOCUMENTS

| | | |
|---|---|---|
| JP | A 2003-204335 | 7/2003 |
| JP | A 2003-229872 | 8/2003 |

OTHER PUBLICATIONS

Zemor, "Cours de Cryptographic," XP002354034, pp. 77-87, 2000.
The Bluetooth Forum, "Blue Tooth Security," XP002171382, pp. 148-182, Feb. 22, 2001.

* cited by examiner

*Primary Examiner*—Bob A. Phunkulh
(74) *Attorney, Agent, or Firm*—Oliff & Berridge, PLC (57) ABSTRACT

A wireless communication system for effecting communication between wireless terminals by structuring an ad hoc network without using an access point, wherein each of the wireless terminals comprises: a receiving unit which receives a beacon signal generated periodically from a wireless terminal of a communication party; an extracting unit which extracts network identification information contained in the beacon signal received by the receiving unit; a setting unit which automatically sets the extracted network identification information; and a session establishing unit which establishes a session by sending a communication request to the wireless terminal of the communication party by using the network identification information set by the setting unit.

6 Claims, 5 Drawing Sheets

<Beacon>

Time Stamp

Beacon Interval

Capability Info

SSID

Supported Rates

Direct Sequence Parameter Set

IBSS Parameter Set

Traffic Indication Map

WIRELESS COMMUNICATION SYSTEM, COMMUNICATION DEVICE, COMMUNICATION CONTROLLING METHOD, AND COMMUNICATION CONTROL PROGRAM

BACKGROUND OF THE INVENTION

1. Field of the Invention

The present invention relates to a wireless communication system, a communication device, a communication controlling method, and a communication control program for effecting transmission and reception of data in a connection mode (ad hoc network) configured by wireless terminals (stations) without the use of a relay device (access point). More particularly, the present invention concerns a wireless communication system, a communication device, a communication controlling method, and a communication control program which make it possible to automate the setting unique to a wireless LAN.

2. Description of the Related Art

In recent years, a wireless LAN is known as a technique in which a plurality of terminals such as PCs (personal computers), PDAs (personal digital assistants), and a printer are connected by wireless links to structure a LAN (local area network). IEEE 802.11 (IEEE 802.11a/b/g) is known as one standard for it.

The most basic component elements which make up a wireless LAN by this IEEE 802.11 standard include an ad hoc network which is configured only by wireless terminals (stations) and an infrastructure network in which communication is effected between stations or with a device on a wired LAN by the use of a relay device (access point).

In a case where a wireless LAN is connected, it is necessary to carry out in advance the setting unique to the wireless LAN, including an SSID (service set identifier) as authentication, WEP (wired equivalent privacy), and the like.

As a technique for automatically executing the setting for wireless LAN connection without requiring the operation of these special settings, "Communication device and method, recording medium, and program" is disclosed in Japanese Patent Application Laid-Open No. 2003-229872.

In the invention in this Japanese Patent Application Laid-Open No. 2003-229872, reference is made to a technique in which a station reads local network information recorded on an IC (integrated circuit) card and executes the network setting in accordance with the information, thereby making it possible to automatically effect the setting for wireless connection without requiring special setting operation by a user.

However, with the invention in Japanese Patent Application Laid-Open No. 2003-229872, there has been a problem in that it is necessary to prepare a recording medium such as an IC card for storing the network setting and a reader for reading the setting from the IC card.

Conventionally, in a network configured by the wireless LAN, although there are advantages that there is no encumbrance of the troublesome cable (cableless) and that the installation or movement of the terminal is free, the complicatedness of the setting operation and fragility in security have been problems.

As functions for strengthening security in the wireless LAN, it is largely possible to cite two kinds: (a) access control and (b) encryption of data.

For instance, the former functions (a) include MAC (media access control) address filtering function, the user authentication function by a RADIUS (remote authentication dial-in user service) server, and the like. In the case of the MAC address registration, however, since the MAC address is described in plain text on a wireless frame, the MAC address can be easily acquired by using a tool, so that spoofing becomes possible.

In addition, in the case where the RADIUS server is used, a user who connected to an access point is authenticated by the RADIUS server, and a determination is made as to whether or not an access is allowed. Hence, this method cannot be applied to the ad hoc network.

On the other hand, the latter functions (b) include, among others, encryption based on WEP. WEP adopts an encryption algorithm of RC4 (Ron's Code 4) and has the function of preventing data concealment, tampering, forgery, spoofing, and the like. However, unless a WEP key is changed after it has been set manually, all the stations repeat connection and authentication by using the same key, so that there is a possibility that a willful user may obtain the WEP key in an unauthorized way and use the WEP key by stealth by making the most use of cryptography.

In addition, it is possible to cite a method in which an IP packet during communication is encrypted by IPsec (IP security) or the like, but in this case there is the problem of an increased processing burden for the station.

Accordingly, the present invention has been devised in view of the above-described problems, and its object is to provide a wireless communication system, a communication device, a communication controlling method, and a communication control program in which the setting unique to a wireless LAN is automatically effected between stations during the establishment of a session.

SUMMARY OF THE INVENTION

An aspect of the present invention provides a wireless communication system for effecting communication between wireless terminals by structuring an ad hoc network without using an access point, wherein each of the wireless terminals comprises: a receiving unit which receives a beacon signal generated periodically from a wireless terminal of a communication party; an extracting unit which extracts network identification information contained in the beacon signal received by the receiving unit; a setting unit which automatically sets the extracted network identification information; and a session establishing unit which establishes a session by sending a communication request to the wireless terminal of the communication party by using the network identification information set by the setting unit.

A further aspect of the present invention provides a communication device for effecting communication between wireless terminals by structuring an ad hoc network without using an access point, comprising: a receiving unit which receives a beacon signal generated periodically from a wireless terminal of a communication party; an extracting unit which extracts network identification information contained in the beacon signal received by the receiving unit; a setting unit which automatically sets the extracted network identification information; a session establishing unit which establishes a session by sending a communication request to the wireless terminal of the communication party by using the network identification information set by the setting unit; a holding unit which holds a prime number and a primitive element which are common to the wireless terminal of the communication party; a random number generating unit; and a common encryption key generating unit which generates a common encryption key by effecting communication with the wireless terminal of the communication party by using the prime number and the primitive element which are held in the holding unit and the random number generated by the random number generating unit, wherein communication is effected by using the common encryption key in the session established by the session establishing unit.

A still further aspect of the present invention provides a communication control method for effecting communication between wireless terminals by structuring an ad hoc network without using an access point, comprising: receiving by a receiving unit a beacon signal generated periodically from a wireless terminal of a communication party; extracting by an extracting unit network identification information contained in the beacon signal received by the receiving unit; automatically setting by a setting unit the extracted network identification information; establishing by a session establishing unit a session by sending a communication request to the wireless terminal of the communication party by using the network identification information set by the setting unit; holding by a holding unit a prime number and a primitive element which are common to the wireless terminals; generating by a common encryption key generating unit a common encryption key by effecting communication between the wireless terminal and the wireless terminal of the communication party by using the prime number and the primitive element which are held in the holding unit and a random number generated by random number generating unit; and effecting communication by using the common encryption key in the session established by the session establishing unit.

A still further aspect of the present invention provides a communication control program for allowing a computer to execute communication control for effecting communication between wireless terminals by structuring an ad hoc network without using an access point, comprising: a receiving step of receiving a beacon signal generated periodically from a wireless terminal of a communication party; an extracting step of extracting network identification information contained in the beacon signal received in the receiving step; a setting step of automatically setting the extracted network identification information; an establishing step of establishing a session by sending a communication request to the wireless terminal of the communication party by using the network identification information set in the setting step; a holding step of holding a prime number and a primitive element which are common to the wireless terminals; a random number generating step; and a common encryption key generating step of generating a common encryption key by effecting communication between the wireless terminal and the wireless terminal of the communication party by using the prime number and the primitive element which are held in the holding step and the random number generated in the random number generating step, wherein communication is effected by using the common encryption key in the session established in the session establishing step.

According to the present invention, the configuration provided is such that the setting unique to a wireless LAN, including the setting of SSID and the setting of the WEP key for performing wireless LAN communication, is automatically effected between the stations at the time of establishment of the session. Therefore, complicated operation at the time of the setting of the wireless LAN is made unnecessary.

In addition, since the encryption key can be shared safely without causing the encryption key to flow through the wireless LAN route, security improves.

BRIEF DESCRIPTION OF THE DRAWINGS

Embodiments of the present invention will be described in detail based on the following figures, wherein.

DETAILED DESCRIPTION OF THE INVENTION

Referring now to the accompanying drawings, a detailed description will be given of the embodiments of a wireless communication system, a communication device, a communication controlling method, and a communication control program in accordance with the present invention.

First Embodiment

Figure 1:
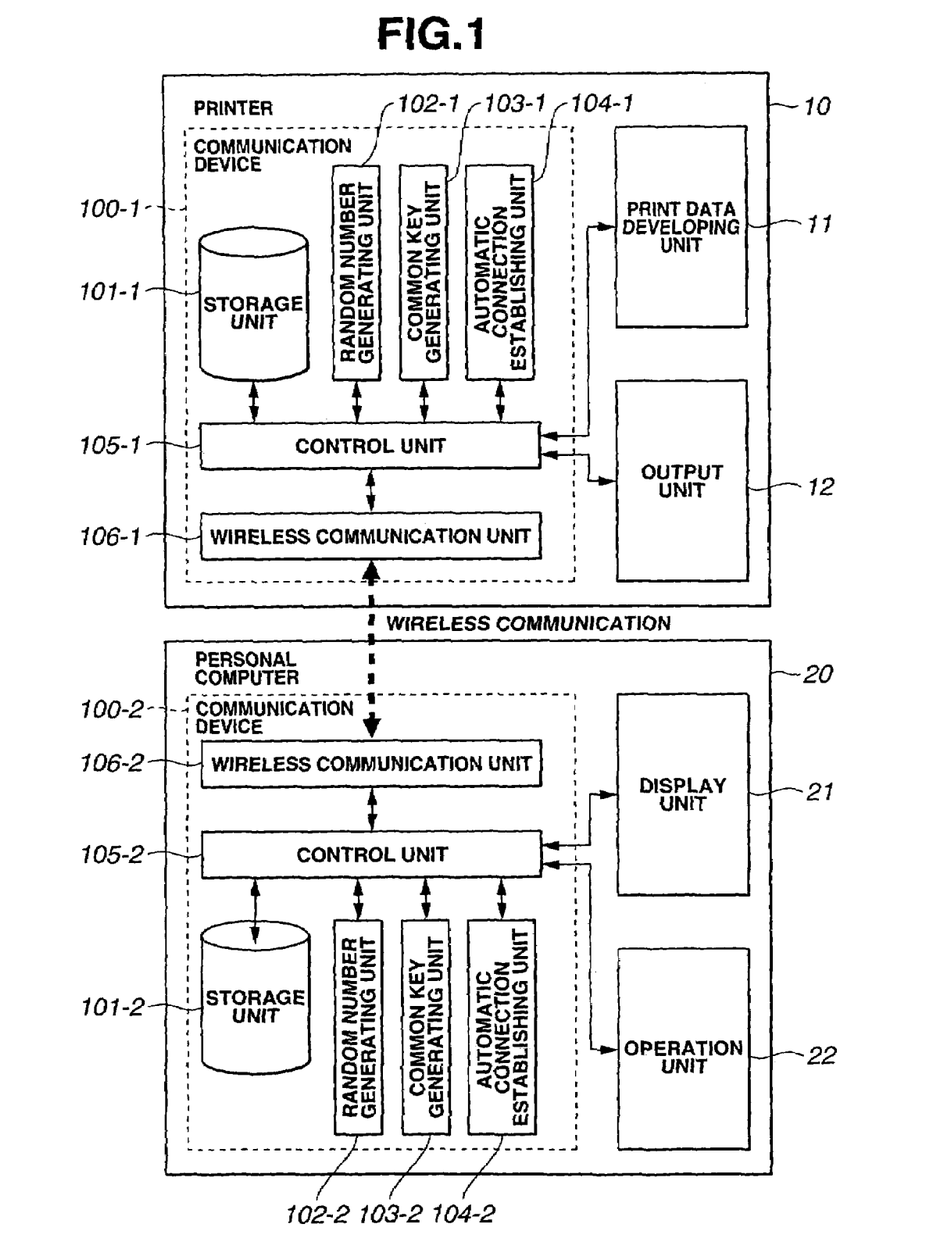
FIG. 1 is a diagram illustrating internal configurations of a personal computer 20 and a printer 10 to which the communication device in accordance with the present invention is applied, respectively.

FIG. 1 is a diagram illustrating an embodiment in accordance with the present invention, and is a diagram illustrating internal configurations of a printer 10 and a personal computer 20 to which the communication device in accordance with the present invention is applied, respectively.

The printer 10 and the personal computer 20 shown in the drawing are capable of communication based on the so-called ad hoc mode in which devices directly effect wireless communication without the use of an access point. Communication devices 100 in accordance with the present invention are provided in their interiors, respectively.

On the basis of communication control of these communication devices 100, wireless LAN communication conforming to the IEEE 802.11 standard is effected in the communication between the printer 10 and the personal computer 20. It should be noted that in the present invention, at the time of encryption processing based on WEP during wireless communication, the DH (Diffie-Hellman) shared-key system is adopted for the generation and exchange processing of a WEP key which is used as the encryption key.

The printer 10 is capable of effecting wireless communication with the personal computer 20, and upon accepting a print instruction from the personal computer 20 the printer 10 effects print processing on the basis of the print instruction. Also provided in the printer 10 are a communication unit 100-1; a print data developing unit 11 for interpreting print data contained in the print instruction transmitted from the personal computer 20 and for developing it into data; and an output unit 12 for outputting the data developed by the print data developing unit 11.

The personal computer 20 has a display device such as a liquid-crystal display as well as an input device such as a keyboard, a mouse, and the like, and is capable of effecting the operation of selecting by an input device the wireless connectable station displayed on the display device. Further, the personal computer 20 has therein a communication device 100-2, a display unit 21 corresponding to the aforementioned display device, and an operation unit 22 corresponding to the aforementioned input device.

Here, a description will be given of the communication devices 100 installed in the printer 10 and the personal computer 20. It should be noted that the communication device 100-1 and the communication device 100-2 are the communication devices 100 which have slight differences in terms of operation including setting conditions and the like, but have substantially identical functions in the other aspects.

The communication device 100 includes as various processing function units a storage unit 101 for storing a prime number P and a primitive element g which are used in the generation of the encryption key based on the DH shared-key system; a random number generating unit 102 for generating a random number used in the generation of the encryption key based on the DH shared-key system; a common key generating unit 103 for generating the encryption key by the DH shared-key system on the basis of information acquired from the random number generating unit 102; an automatic connection establishing unit 104 for automatically establishing a LAN connection by using SSID (network identification information) or the like which has been set in advance; a control unit 105 for providing general control of the communication device 100; and a wireless communication unit 106 which is an interface device enabling communication with other devices by wireless.

The prime number P and the primitive element g which are stored in the aforementioned storage unit 101 are set to values common to the printer 10 and the personal computer 20. Described above are the internal configurations of the printer 10 and the personal computer 20 in accordance with the present invention.

Figure 2:
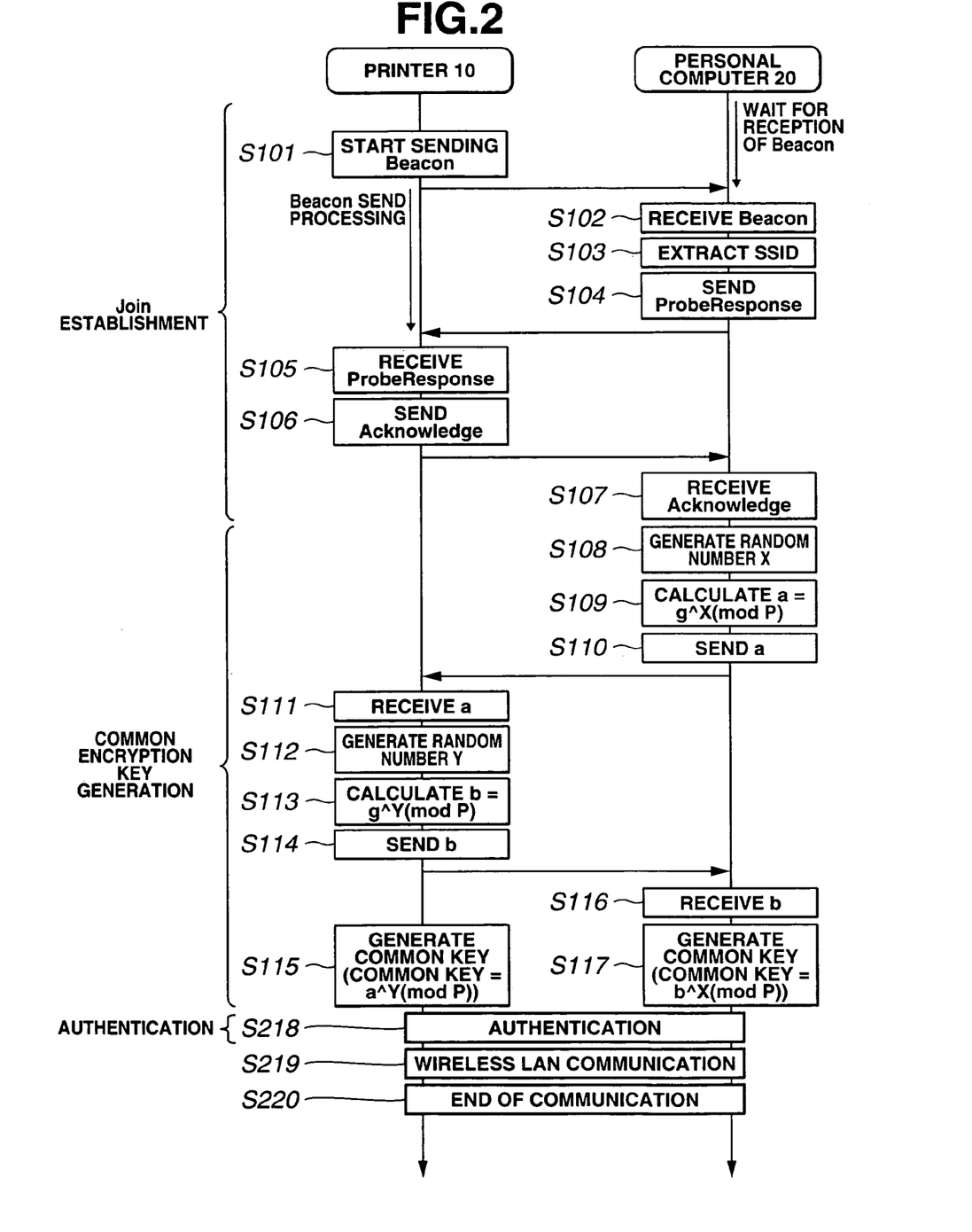
FIG. 2 is a sequence chart diagram explaining the operation of a communication control method in the personal computer 20 and the printer 10 shown in FIG. 1.

FIG. 2 is a sequence chart diagram explaining the operation of a communication control method in the printer 10 and the personal computer 20 shown in FIG. 1.

Figure 3:
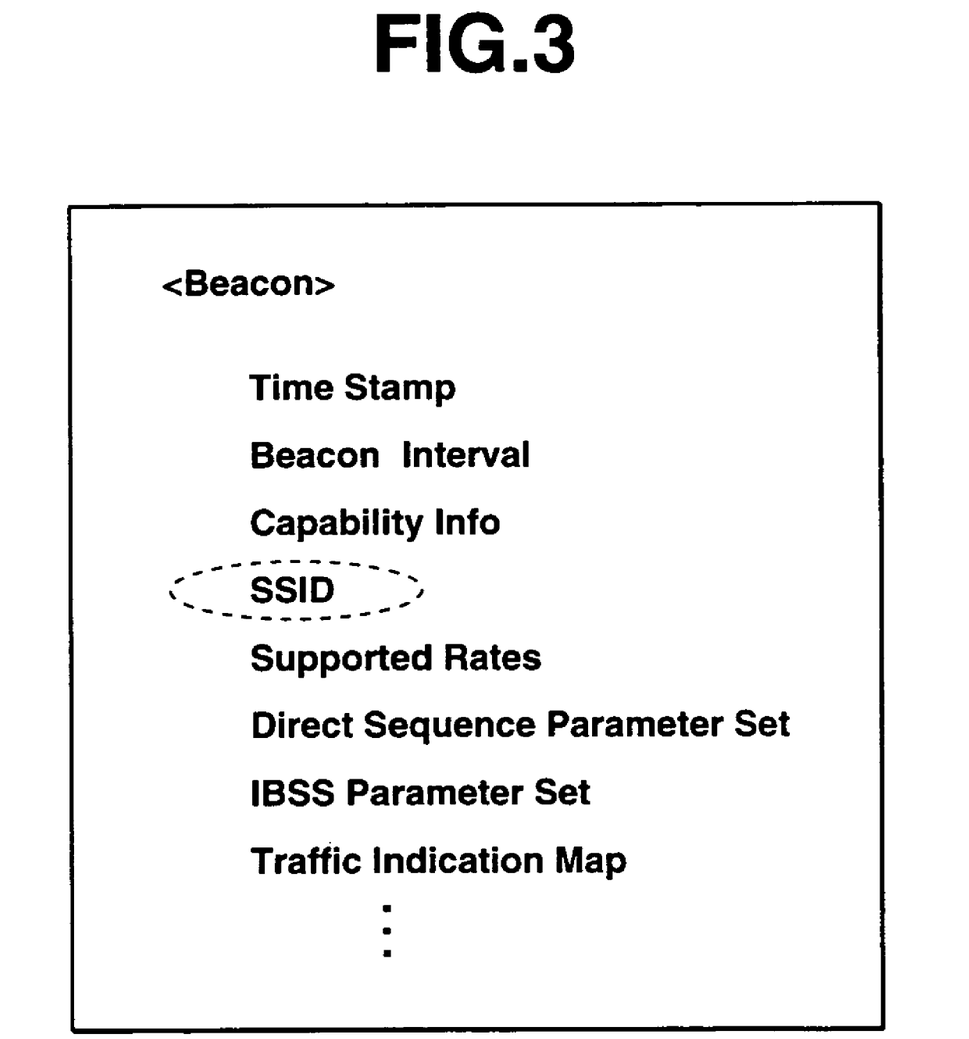
FIG. 3 is a diagram illustrating an example of the contents of the configuration of a Beacon packet.

The establishment of connection between the printer 10 and the personal computer 20 is executed by the sending and receiving of Beacon and Probe Response packets. First, an automatic connection establishing unit 104-1 of the printer 10 periodically sends a Beacon packet through a wireless communication unit 106-1 (Step S101). This Beacon packet is configured by information including SSID, as shown in FIG. 3. This SSID is stored in advance in a storage unit 101-1.

Meanwhile, the personal computer 20 is in a state of waiting for the reception of the Beacon packet, and upon receiving the Beacon packet sent from the printer 10 by a wireless communication unit 106-2 (Step S102), the personal computer 20 extracts SSID from the received Beacon packet by an automatic connection establishing unit 104-2 (Step S103) and generates and sends Probe Response (Step S104). At this time, in a case where Beacon packets have been sent from a plurality of stations, a station may be selected on the basis of, among others, automatic selection according to priority information registered in advance, automatic selection in which priority is placed on a station whose electric wave strength is strong, or manual selection in which wireless connectable terminals are displayed on the display device.

If the printer 10 which received Probe Response from the personal computer 20 by the wireless communication unit 106-1 recognizes that it is a connection request to its own device by the automatic connection establishing unit 104-1, the printer 10 accepts the communication with the personal computer 20 (Step S105), and returns Acknowledge for enabling communication through the wireless communication unit 106-1 (Step S106). The personal computer 20 then receives Acknowledge through the wireless communication unit 106-2 (Step S107). As a result, Join between the printer 10 and the personal computer 20 is established.

The above-described processing up to Step 107 is Join establishment processing, and common encryption key generation processing will be described in the processing in Step S108 and thereafter.

When Join is established, a random number X is generated in a random number generating unit 102-2 of the personal computer 20 (Step S108). Upon receiving the result, a common key generating unit 103-2 calculates a formula: $a = g^X \pmod P$ by using the random number X as well as the prime number P and the primitive element g fetched from a storage unit 101-2 (Step S109). The automatic connection establishing unit 104-2 of the personal computer 20 then sends the value a obtained as a result of the calculation to the printer 10 through the wireless communication unit 106-2 (Step S110).

Meanwhile, the printer 10, upon receiving the value a through the wireless communication unit 106-1 (Step S111), generates a random number Y in a random number generating unit 102-1 in the same way as the personal computer 20 (Step S112). Upon receiving the result, a common key generating unit 103-1 calculates a formula: $b = g^Y \pmod P$ by using the random number Y as well as the prime number P and the primitive element g fetched from the storage unit 101-1 (Step S113). The automatic connection establishing unit 104-1 of the printer 10 then sends the value b obtained as a result of the calculation to the personal computer 20 through the wireless communication unit 106-1 (Step S114).

Subsequently, the printer 10 generates a common encryption key by calculating a formula: $a^Y \pmod P$ or $g^{(XY)} \pmod P$ by using the aforementioned values by the common key generating unit 103-1 (Step S115).

In addition, the personal computer 20, upon receiving the value b through the wireless communication unit 106-2 (Step S116), generates a common encryption key by calculating a formula: $b^X \pmod P$ or $g^{(XY)} \pmod P$ by using the aforementioned values by the common key generating unit 103-2 (Step S117).

It should be noted that the same results of calculation are obtained for the formulae: $a^Y \pmod P$, $b^X \pmod P$, and $g^{(XY)} \pmod P$.

The above-described processing up to Step 117 is the common encryption key generation processing. Since the encryption key is generated by the DH shared-key system, as described above, the encryption key can be shared safely without causing the encryption key to flow on a wireless LAN route, so that security improves.

Upon completion of the above-described common encryption key generation processing, authentication processing is then executed (Step S118). Specifically, the respective control units 105 of the printer 10 and the personal computer 20 effect the encryption of authentication information including SSID and the like by using the common encryption key generated in the above-described common encryption key generation processing. Authentication processing is executed as the automatic connection establishing units 104 send and receive the encrypted authentication information.

In the case of a normal authentication result, wireless communication is started between the printer 10 and the personal computer 20, and, for example, a print instruction is given from the personal computer 20 to the printer 10 to thereby conduct a series of communication processing (session) (Step S119). Upon completion of the session (Step S120), the printer 10 restarts the sending of Beacon including SSID.

As described above, in the present invention, the configuration provided is such that the setting unique to a wireless LAN, including the setting of SSID in authentication processing and the setting of the WEP key in encryption processing for performing wireless LAN communication, is automatically effected between the stations at the time of establishment of the session. Therefore, complicated operation at the time of the setting of the wireless LAN is made unnecessary.

In addition, since the encryption key can be shared safely without causing the encryption key to flow through the wireless LAN route, security improves.

It should be noted that although in the above-described embodiment a description has been given of the case where the present invention is applied to an ad hoc network, the present invention is not limited to the same, and may be applied to an infrastructure network connected by means of a relay device (access point).

Second Embodiment

In the above-described first embodiment a description has been given of the case where the printer 10 and the personal computer 20 are connected on a peer-to-peer basis. In a second embodiment, a description will be given of an embodiment in which the printer 10 is used by being shared by a plurality of stations (personal computers 20).

Figure 4:
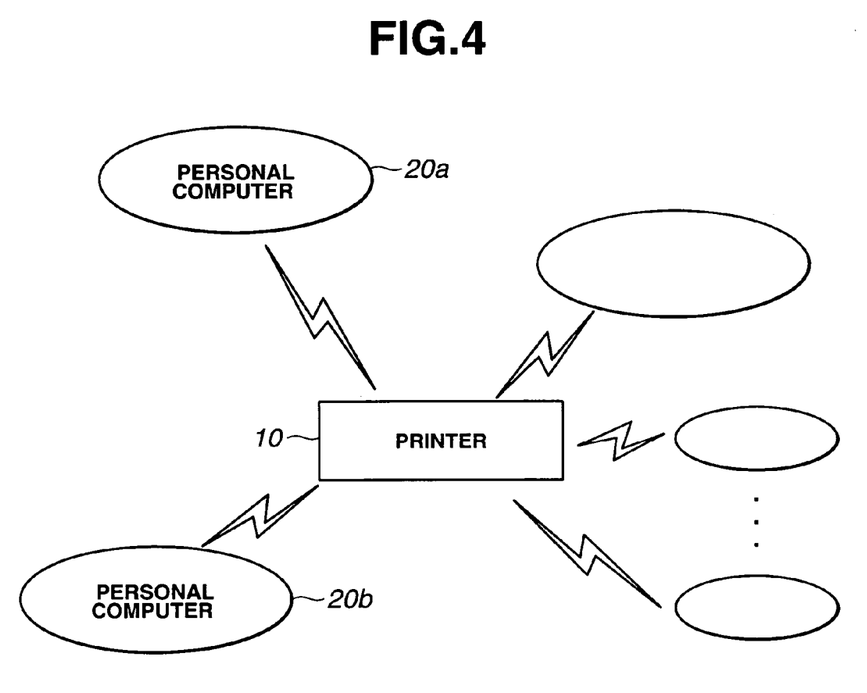
FIG. 4 is a diagram illustrating an overall configuration in accordance with a second embodiment of the invention.

FIG. 4 is a diagram illustrating an overall configuration of a wireless LAN network configured by the printer 10 and a plurality of personal computers (20a, 20b: hereafter, generally denoted by 20) to which the communication device 100 in accordance with the present invention is applied, respectively. It should be noted that since units denoted by the same reference numerals as those shown in FIG. 1 referred to above and explaining the first embodiment operate in substantially the same way and their internal configurations are also identical, a description thereof will be omitted. The personal computer 20a and the personal computer 20b are identical to the personal computer 20 shown in FIG. 1 explaining the first embodiment.

Figure 5:
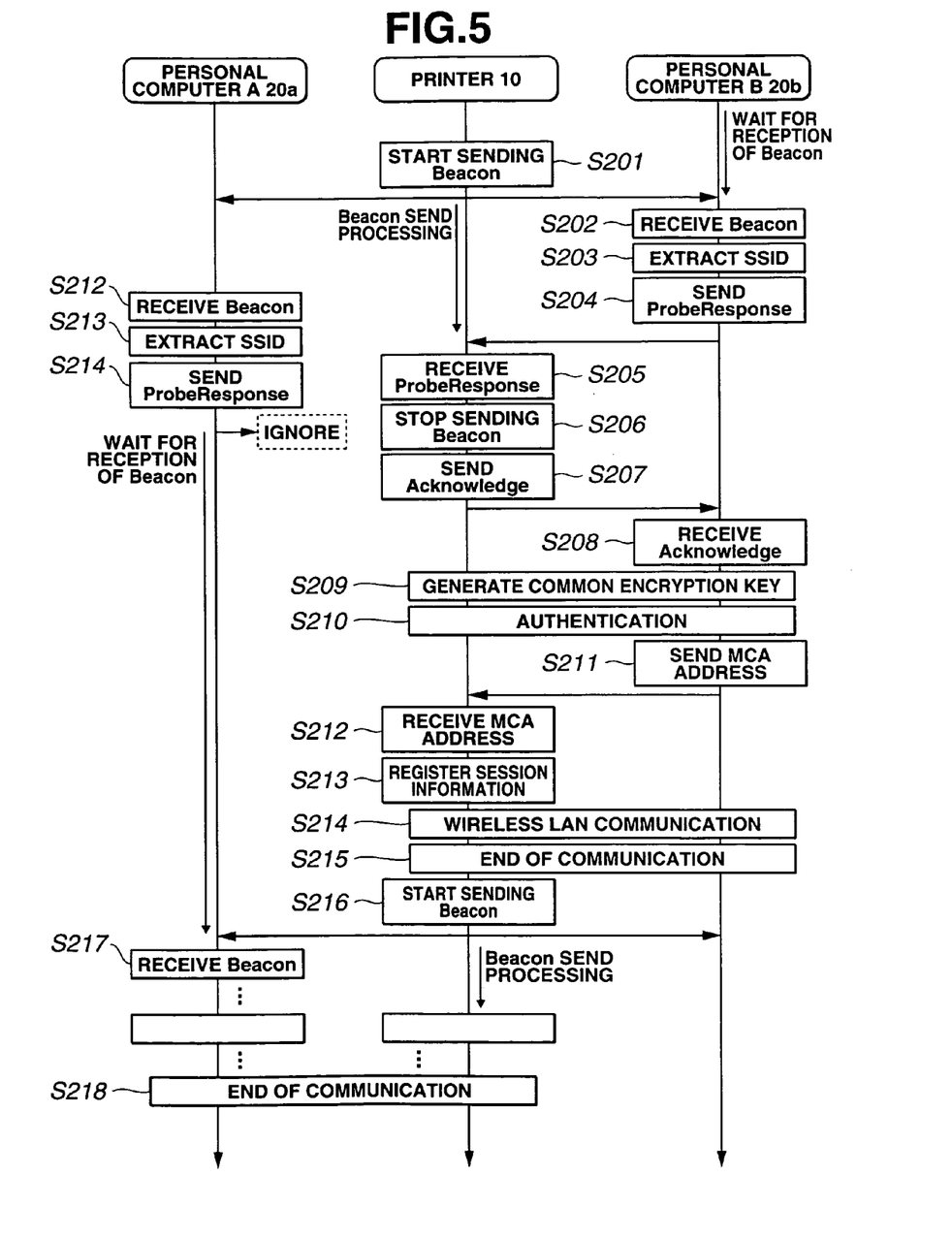
FIG. 5 is a sequence chart diagram explaining the operation of the communication control method in accordance with the second embodiment.

FIG. 5 is a sequence chart diagram explaining the operation of the communication control method in the printer 10 and the personal computers 20 shown in FIG. 4. It should be noted that a description will be given by adding '-2' to the end of the reference numeral in the case of the respective functional units of processing of the personal computer 20a and by adding '-3' to the end of the reference numeral in the case of the respective functional units of processing of the personal computer 20b. For example, the control unit of the personal computer 20a is denoted by 105-2, while the control unit of the personal computer 20b is denoted by 105-3.

The establishment of connection between the printer 10 and the personal computer 20 is executed by the sending and receiving of Beacon and Probe Response packets. First, the automatic connection establishing unit 104-1 of the printer 10 periodically sends a Beacon packet through the wireless communication unit 106-1 (Step S201). This Beacon packet is configured by information including SSID, as shown in FIG. 3. This SSID is stored in advance in the storage unit 101-1.

Meanwhile, the personal computer 20b is in a state of waiting for the reception of the Beacon packet, and upon receiving the Beacon packet sent from the printer 10 by a wireless communication unit 106-3 (Step S202), the personal computer 20b extracts SSID from the received Beacon packet by an automatic connection establishing unit 104-3 (Step S203) and generates and sends Probe Response (Step S204). At this time, in a case where Beacon packets have been sent from a plurality of stations, al station may be selected on the basis of, among others, automatic selection according to priority information registered in advance, automatic selection in which priority is placed on a station whose field strength is strong, or manual selection in which wireless connectable terminals are displayed on the display device.

If the printer 10 which received Probe Response from the personal computer 20b by the wireless communication unit 106-1 recognizes that it is a connection request to its own device by the automatic connection establishing unit 104-1, the printer 10 accepts the communication with the personal computer 20b (Step S205), stops sending the Beacon packet (Step S206), and returns Acknowledge for enabling communication through the wireless communication unit 106-1 (Step S207). The personal computer 20b then receives Acknowledge through the wireless communication unit 106-3 (Step S208). As a result, Join between the printer 10 and the personal computer 20b is established.

In addition, the personal computer 20a similarly receives the Beacon packet from the printer 10 by the wireless communication unit 106-2 (Step S212), extracts SSID from the received Beacon packet by the automatic connection establishing unit 104-2 (Step S213), and generates and sends Probe Response (Step S214). However, since Join has already been established with the personal computer 20b, the printer 10 ignores this Probe Response. Further, since the printer 10 also stops sending the Beacon packet, the printer 10 is in a state of being unable to establish Join with the personal computer 20a. Consequently, interrupt processing by another device can be prohibited. Namely, the personal computer 20a can be set in a state of waiting for communication.

Between the printer 10 and the personal computer 20b for which Join has been established, common encryption key generation processing (Step S209) and authentication processing (Step S210), which are similar to those described in the above-described first embodiment, are executed. In the case of a normal authentication result, the control unit 105-3 of the personal computer 20b effects encryption of an MAC address by using the common encryption key generated in the common encryption key generation processing, and sends the encrypted MAC address to the printer 10 through the wireless communication unit 106-3 (Step S211). The printer 10, upon receiving the encrypted MAC address through the wireless communication unit 106-1, decrypts it in the control unit 105-1 by using the common encryption key (Step S212), relates the common encryption key to the MAC address, and registers them as session information (Step S213). This session information is used when after completion of the series of session, communication is started again between the printer 10 and the personal computer 20b, and the communication start is facilitated by using this session information.

After the registration processing of the session information, for example, a print instruction is given from the personal computer 20b to the printer 10 to thereby conduct a series of communication processing (session) (Step S214).

Upon completion of the session (Step S215), the printer 10 restarts the sending of Beacon including SSID (Step S216).

Here, the personal computer 20a in the state of waiting for the reception of the Beacon packet receives the Beacon packet sent from the printer 10 by the wireless communication unit 106-2, and when a series of communication processing is completed after establishing connection through predetermined processing such as the establishment of Joint (Step S218), the printer 10 restarts the sending of Beacon.

As described above, in the second embodiment, even if communication requests are simultaneously given to a specific station (printer 10) from a plurality of stations (personal computers 20), an optimum communication sequence can be provided by incorporating an arbitration function into the printer 10.

It should be noted that, the priority order of the arbitration function of the printer 10 described in the foregoing second embodiment may be selected based on automatic selection according to priority information registered in advance, automatic selection in which priority is placed on a station whose electric wave strength is strong, and manual selection in which wireless connectable terminals are displayed on the display device. However, the method of selection is not particularly limited insofar as it is capable of providing an optimum communication sequence.

In addition, although in the first and second embodiments a description has been given of the case where the communication device in accordance with the present invention is implemented by being applied to the printer 10 and the personal computer 20, respectively, the above-described communication control processing may be arranged to be executed by a communication control program installed in a computer.

In addition, the present invention may be practiced by being appropriately modified within the scope that does not change its gist and without being limited to the embodiments described above and illustrated in the drawings. It goes without saying that the communication device in accordance with the present invention is applicable to devices other than the personal computer and the printer.

The wireless communication system, the communication device, the communication controlling method, and the communication control program in accordance with the present invention are applicable to communication devices in general for effecting communication in an ad hoc network. In particular, since the setting unique to a wireless LAN is automated, a mobile terminal or the like can be effectively utilized at a place of destination.

The entire disclosure of Japanese Patent Application No. 2004-241078 filed on Aug. 20, 2004 including specification, claims, drawings and abstract is incorporated herein by reference in its entirety.

What is claimed is:

1. A wireless communication system for effecting communication between wireless terminals by structuring an ad hoc network without using an access point, wherein each of the wireless terminals comprises:
    a receiving unit which receives a beacon signal generated periodically from a wireless terminal of a communication party;
    an extracting unit which extracts network identification information contained in the beacon signal received by the receiving unit;
    a setting unit which automatically sets the extracted network identification information; and
    a session establishing unit which establishes a session by sending a communication
    request to the wireless terminal of the communication party by using the network identification information set by the setting unit;
    wherein each of the wireless terminals and the wireless terminal of the communication party comprise:
    a holding unit which holds a prime number and a primitive element which are common to the wireless terminals:
    a random number generating unit; and a common encryption key generating unit which generates a common encryption key by effecting communication between the wireless terminal and the wireless terminal of the communication party by using the prime number and the primitive element which are held in the holding unit and the random number generated by the random number generating unit.

2. The wireless communication system according to claim 1, wherein the wireless terminal of the communication party comprises a communication arbitration unit which selectively transmits a communication enabling signal to the wireless terminal of the communication party has received communication requests from a plurality of the wireless terminals.

3. The wireless communication system according to claim 1, wherein the wireless terminal of the communication party further comprises a storing unit which stores the common encryption key relating the common encryption key to the identification information of the wireless terminal which made the communication request, and wherein connection is established by using the common encryption key and the identification information stored in the storing unit at the time of the processing of reconnection to the wireless terminal.

4. A communication device for effecting communication between wireless terminals by structuring an ad hoc network without using an access point, comprising:
    a receiving unit which receives a beacon signal generated periodically from a wireless terminal of a communication partly;
    an extracting unit which extracts network identification information contained in the beacon signal received by the receiving unit;
    a setting nit which automatically sets the extracted network identification information;
    a session establishing unit which establishes a session by sending a communication request to the wireless terminal of the communication party by using the network identification information set by the setting unit;
    a holding unit which holds a prime number and a primitive element which are common to the wireless terminal of the communication party;
    a random number generating unit; and
    a common encryption key generating unit which generates a common encryption key by effecting communication with the wireless terminal of the communication party by using the prime number and the primitive element which are held in the holding unit and the random number generate by the random number generating unit,
    wherein communication is effected by using the common encryption key in the session established by the session establishing unit.

5. A communication control method for effecting communication between wireless terminals by structuring an hoc network without using an access point, comprising:

receiving by receiving means a beacon signal generated periodically from a wireless terminal of a communication party;

extracting by extracting means network identification information contained in the beacon signal received by the receiving means;

automatically setting by setting means the extracted network identification information;

establishing by session establishing means a session by sending a communication request to the wireless terminal of the communication party by using the network identification information set by the setting means;

holding by holding means a prime number and a primitive element which are common to the wireless terminals;

generating by common encryption key generating means a common encryption key by effecting communication between the wireless terminal and the wireless terminal of the communication party by using the prime number and the primitive element which are held in the holding means and a random number generated by random number generating means; and effecting communication by using the common encryption key in the session established by the session establishing means.

6. A communication control program for allowing a computer to execute communication control for effecting communication between wireless terminals by structuring an ad hoc network without using an access point, comprising:

a receiving step of receiving a beacon signal generated periodically from a wireless terminal of a communication party;

an extracting step of extracting network identification information contained in the beacon signal received in the receiving step;

a setting step of automatically setting the extracted network identification information;

an establishing step of establishing a session by sending a communication request to the wireless terminal of the communication party by using the network identification information set in the setting step;

a holding step of holding a prime number and a primitive element which are common to the wireless terminals;

a random number generation step; and a common encryption key generating step of generation a common encryption key by effecting communication between the wireless terminal and the wireless terminal of the communication party by using the prime number and the primitive element which are held in the holding step and the random number generated in the random number generation step, wherein communication is effected by using the common encryption key in the session established in the session establishing step.

* * * * *